(12) United States Patent
Fisher

(10) Patent No.: US 6,789,683 B1
(45) Date of Patent: Sep. 14, 2004

(54) CAMP COOK KIT STRAINER

(76) Inventor: John M. Fisher, 6 Erie Crescent, Fairport, NY (US) 14450

( * ) Notice: Subject to any disclaimer, the term of this patent is extended or adjusted under 35 U.S.C. 154(b) by 42 days.

(21) Appl. No.: 09/945,285

(22) Filed: Aug. 31, 2001

Related U.S. Application Data (60) Provisional application No. 60/229,103, filed on Aug. 31, 2000.

(51) Int. Cl.$^7$ ................................................ B01D 35/28
(52) U.S. Cl. ...................... 210/465; 210/469; 210/471; 210/473; 99/410; 99/413; 99/450; 222/189.03; 222/189.07; D7/667
(58) Field of Search ................................ 210/464–465, 210/472, 473, 477, 469, 470, 471; 222/189.06–189.07, 189.11, 189.02, 189.03; D7/354, 356, 667, 668, 397–398, 701, 369, 327; 99/336, 413, 403, 410, 450; 206/541, 549

(56) References Cited

U.S. PATENT DOCUMENTS

| | | | |
|---|---|---|---|
| 1,239,834 A | * | 9/1917 | Smith .......................... 134/135 |
| 1,767,269 A | * | 6/1930 | Westerberg |
| 2,732,696 A | * | 1/1956 | Baker .......................... 99/446 |
| 3,390,781 A | * | 7/1968 | Anderson |
| 4,220,534 A | | 9/1980 | Perry .......................... 210/232 |
| 4,873,918 A | | 10/1989 | Goldman ...................... 99/403 |
| 5,035,800 A | * | 7/1991 | Kopach ........................ 210/469 |
| 5,615,607 A | | 4/1997 | Delaquis et al. .............. 99/409 |
| 5,653,881 A | | 8/1997 | Bruss et al. ................. 210/467 |
| 5,730,045 A | | 3/1998 | Delaquis et al. .............. 99/337 |
| 5,957,038 A | | 9/1999 | Shimazaki .................... 99/340 |

OTHER PUBLICATIONS

Merriam–Webster Collegiate Dictionary, 10$^{th}$ ed., copywright 1998 by Merriam–Webster, Incorporated, p. 794.*

* cited by examiner

Primary Examiner—W. L. Walker
Assistant Examiner—Marianne S. Ocampo
(74) Attorney, Agent, or Firm—Brown & Michaels, PC; Eugene Stephens & Associates (57) ABSTRACT

A strainer assembly for a camp cooking kit has a strainer body having at least one rim for engaging a rim of a camp cooking pot and a plurality of openings for pouring liquid from the camp cooking pot while preventing egress of other contents from the pot. Strap guiding features formed in the strainer body provide for guiding a securing strap around both the strainer body and the camp cooking pot. The securing strap includes a fastening arrangement for securing the securing strap together for attaching the strainer body to the camp cooking pot. Handles, which can be formed in the strainer body or attached to the securing strap enable the strainer body to be tipped together with the camp cooking pot to strain the contents of the cooking pot.

11 Claims, 9 Drawing Sheets

CAMP COOK KIT STRAINER

RELATED APPLICATIONS

This application claims the benefit of U.S. Provisional Application No. 60/229,103, filed Aug. 31, 2000, which provisional application is incorporated by reference herein.

FIELD OF INVENTION

This invention relates to camp cooking kits that are light weight, compact, and designed for use in wilderness camp cooking situations. Specifically, this invention is used to strain hot or cold water from a cook kit pot when boiling or re-hydrating is the means of preparing a selected food item, such as pasta or dehydrated beans. A secondary use due to its shape and composition is that of a cutting board.

BACKGROUND

Various manufacturers have supplied reliable strainers for domestic and commercial use. These strainers are typically bowl or pot shaped and may incorporate one or more features such as: a single handle, a pair of handles, or an extended handle and legs. These strainers contain drainage holes that vary in number and size in proportion to the items to be strained. The volume of these strainers also varies from small to large. The material of their construction varies as well. The most common today is plastic. Aluminum and stainless steel are also used. Some strainers are incorporated into the lids of specially designed pots. In such cases, the material of their construction is typically aluminum or stainless steel.

The straining operation is a simple one. The strainer is placed in or held over a sink or a large bowl or service pot. The hot pot containing boiling water and the food to be strained is poured into the strainer so that the strainer catches the prepared food. The strainer and the used pots are placed about the cooking area as meal preparation continues and addressed later during clean up. A conventional strainer and the procedure described above work well in a domestic or a commercial kitchen, but doing the same in a wilderness camp cooking situation can be hazardous. The known strainers suffer a number of disadvantages including:

(a) The size and shape of conventional strainers favor a countertop or sink work area; something not available in a wilderness cooking situation. As a substitute, the ground, an old log, or a semi-flat rock are generally less than adequate. At any stage of the process, the cooking pot, the strainer, or service pot can be set down and thereby rendered vulnerable to tipping, accidental bumping, dropping, kicking, or invasion by chipmunks.

(b) The size and shape of conventional strainers are not conductive to camp cooking techniques, compact packing, and transport in a backpack.

(c) The procedure exposes the user of the strainer to injury from splattering boiled water.

SUMMARY OF INVENTION

In accordance with one or more embodiments of the present invention, a camp cook kit strainer comprises a flat body that is circumvented by an outer side rim and has one or more pairs of gripping handles. Between each pair or within each one of the gripping handles is a notch or slot feature that guides a securing strap. A top surface of the strainer body contains one large strainer port or two opposing strainer ports that are perpendicular to the gripping handles. To accommodate a range of cooking pot sizes, one or more concentric arc segments project from a bottom surface of the strainer body to function as alternative rims. The securing strap can include a hook and loop fastening system, together with a D-ring accessory, to secure the strainer to a cook kit pot for performing the actual straining process.

Another embodiment includes a similar strainer body without handles. However, notches or slots are retained in the strainer body to guide the securing strap, which wraps around both the strainer body and a cook kit pot. Handles are attached along the securing strap for emptying cook kit pots through the attached strainer body.

Various objects and advantages of the camp cook kit strainer include:

(a) To provide a device and a procedure for straining hot or cold water from a cook kit pot securely and reliably without compromising the prepared contents when exposed to potential dropping, accidental bumping and kicking, or invasion by chipmunks.

(b) To provide a device that is not only conductive to compact packing and transport but complements stock camp cook kit design and camp cooking techniques.

(c) To provide a device and a procedure that reduce the risk of burns from splattered boiled water.

DRAWINGS

In the drawings, corresponding features share the same reference numerals, although alphabetic suffixes are sometimes appended for clarity.

Reference Numerals in Drawings 10 handle
12 grip notch
14 ribs
16 securing strap notch
18 outer side rim -continued

| | |
|---|---|
| 20 | middle pot rim |
| 22 | inner pot rim |
| 24 | bottom edge |
| 26 | strainer port |
| 28 | strainer openings |
| 30 | securing strap |
| 32 | securing tabs |
| 34 | fastener loops |
| 36 | fastener hooks |
| 38 | D-ring |
| 40 | strap handle |
| 42 | cooking pot |
| 44 | slotted handle |
| 46 | slot |
| 48 | top surface |
| 50 | strainer body |
| 52 | strap handle |
| 54 | handle bars |
| 56 | handle grips |

DETAILED DESCRIPTION

Figure 1:
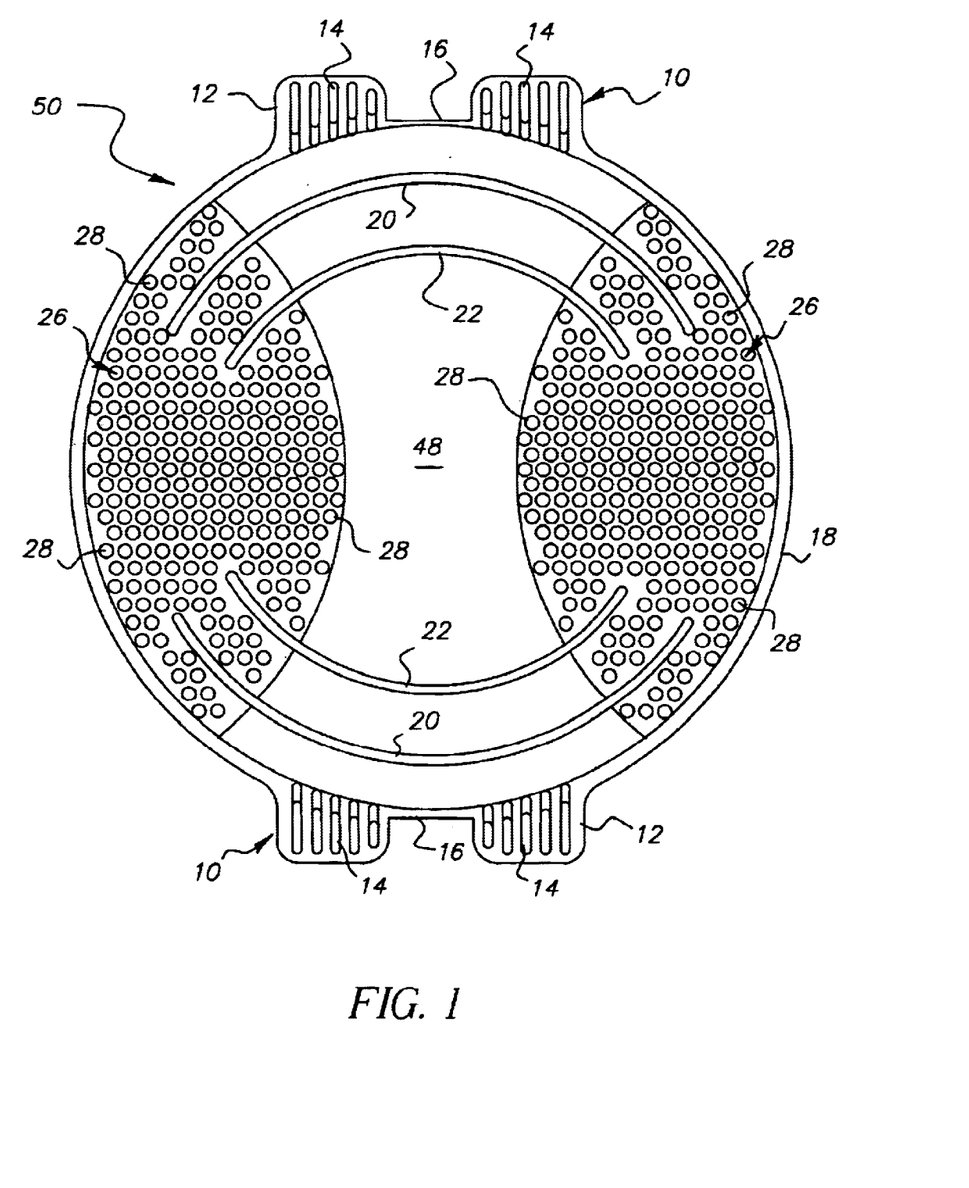
FIG. 1 shows a top view of an exemplary camp cook kit strainer body made according to my invention.
Figure 2:
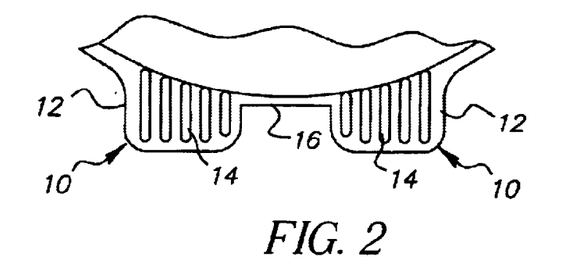
FIG. 2 shows a broken-away view of a pair of handles separated by a securing strap notch.
Figure 3:
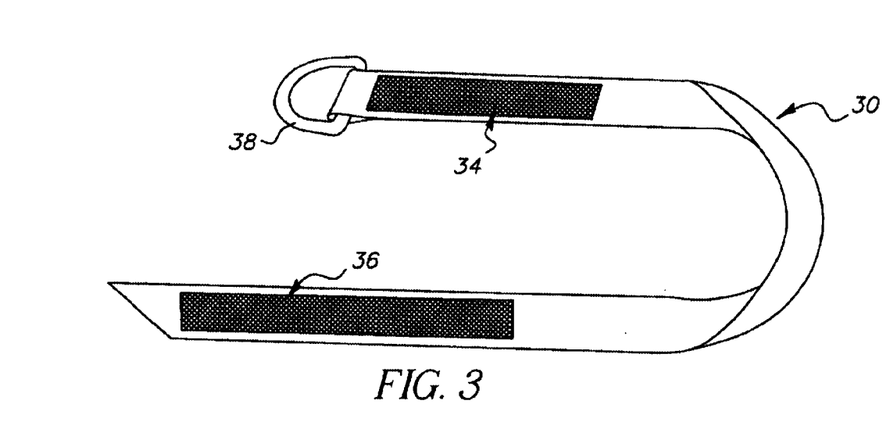
FIG. 3 shows a securing strap with a D-ring.

One embodiment of my strainer assembly is illustrated by parts in FIGS. 1 through 3 and by assembly and use steps in FIGS. 4A through 4H. An exemplary camp cook kit strainer according to my invention has a monolithic body 50 of uniform construction fashioned from a rigid material consistent with industry requirements for food applications that can stand up to repeated use in camp cooking situations. In the preferred embodiment, the material is a resin composite, such as a molded thermoplastic resin. However, the camp cook kit strainer 50 can be made of other non-ferrous or ferrous materials that meet industry standards for food applications, such as stainless steel, aluminum, non-stick coated steel or aluminum, and titanium.

The strainer body 50 includes three concentric pot rims 18, 20, and 22, which are arranged in diameter to accommodate a range of conventionally sized cook kit pots by loosely engaging rim surfaces of the camp kit cook pots. The middle rim 20 and inner rim 22 are formed as concentric arc segments for engaging inner or outer rim surfaces of the camp kit cook pots. For example, the outer rim 18 preferably measures roughly 9.7 inches in diameter, the middle pot rim measures roughly 8.0 inches in diameter, and the inner pot rim 22 measures roughly 5.0 inches in diameter. These three measurements allow for variations in camp cook kit pots selected for use. These variations include 2 liter, 2.5 liter 3 liter, or 4 liter pots as well as 2 quart, 3 quart, or 4 quart pots.

Two pairs of handles 10 are integrally formed in opposite sides of the strainer body 50. Each handle 10 is substantially square shaped and contains through-cut ribs 14 (see FIG. 2) that provide the handles with strength and gripping integrity for lifting and straining cook pots full of water. Grip notches 12 are formed as indentations in outer-most sides of the handles 10 adjacent to the outer side rim 18 to provide for more securing gripping the pairs of handles 10.

Located perpendicular to the handles on opposite sides are two semi-circular shaped clusters of strainer openings 28, which function as strainer ports 26. Each of the openings 28 is preferably formed as a through hole in the strainer body 50, measuring approximately 0.125 inches in diameter (although other sizes can be used depending on the items to the strained). The clusters of strainer openings 28 forming each semi-circular port 26 cover approximately 6 square inches of area each.

The strainer body 50 has a flat top surface 48 and a consistent thickness, which enables the strainer body 50 to also function as a cutting board. The three pot rims 18, 20, and 22 and the two pairs of handles 10 have equal overall thickness (e.g., around 1 inch), so the strainer body 50 lays level on a flat surface and can be packed together with other items of a cook kit in a stack.

The handles 10 of each pair are separated by securing strap notches 16, which preferably measure in this instance around 1.5 inches in width to accommodate a securing strap 30 shown in FIG. 3. The strap 30, which is preferably formed of a flexible material of reliable strength, includes a loop-type fastener patch adjacent to one end and a hook-type fastener patch 36 adjacent to an opposite end (e.g., VELCRO patches). A D-ring 38 is also secured at one end of the strap 30.

A preferred manner of assembling and using the camp cook kit strainer body 50 and strap 30 to strain water off prepared foods is quite different from strainers of domestic use. As precaution, cotton gloves like the type made by WORKFARE—style Double Layer Chore, model #099275 should be worn to avoid burns caused by accidental contact with the pot. The process can be completed in a succession of easy steps laid out in FIGS. 4A through 4F and described below.

Step 1 (FIG. 4A), place the securing strap 30 on a relatively flat and stable surface.

Step 2 (FIG. 4B), wearing gloves, place a camp cook kit pot 42 to be strained on the securing strap 30 in such a way that the strap 30 is in the middle of the pot 42.

Step 3 (FIG. 4C), place the strainer body 50 on the pot 42, fitting the pot 42 to the appropriate outer 18, middle 20, or inner 22 pot rim and be sure that the securing strap notches 16 of the handles 10 line up directly above the securing straps 30.

Figures 4A, 4B, 4C, 4D:
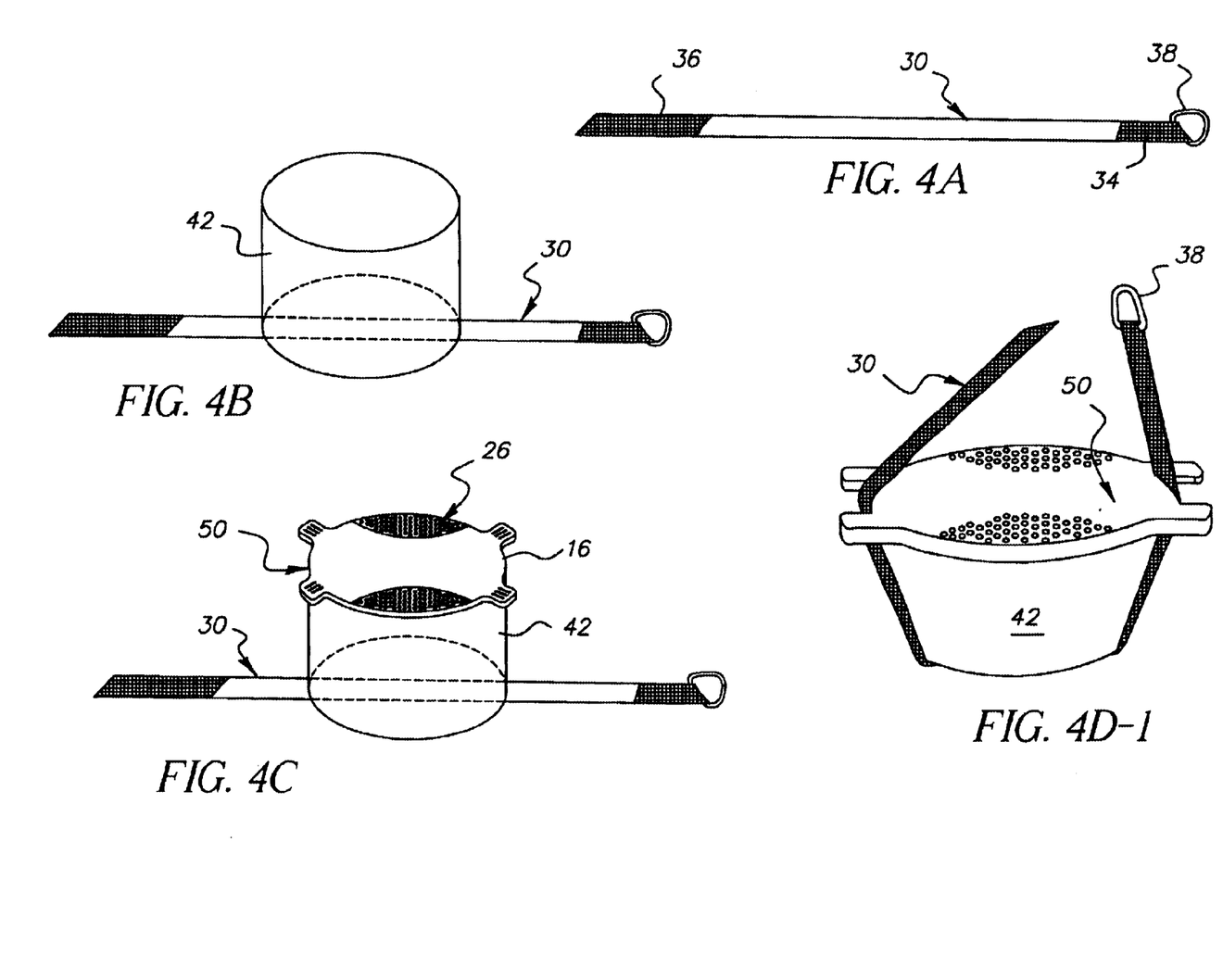
FIGS. 4A through 4H show operational aspects of the camp cook kit strainer assembly of FIGS. 1 through 3.
Figure 4D:
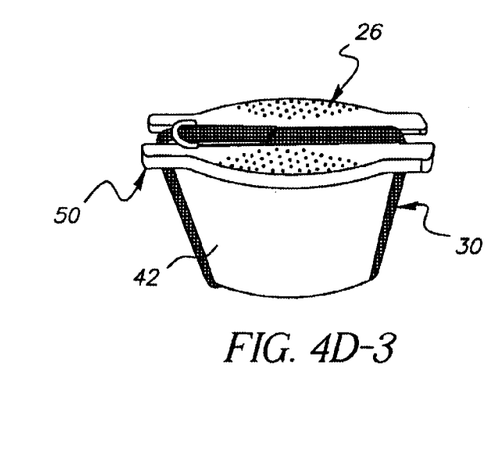
Figure 4D:
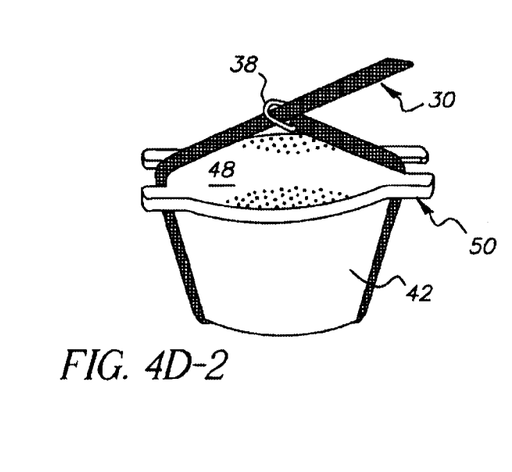
Figure 4E:
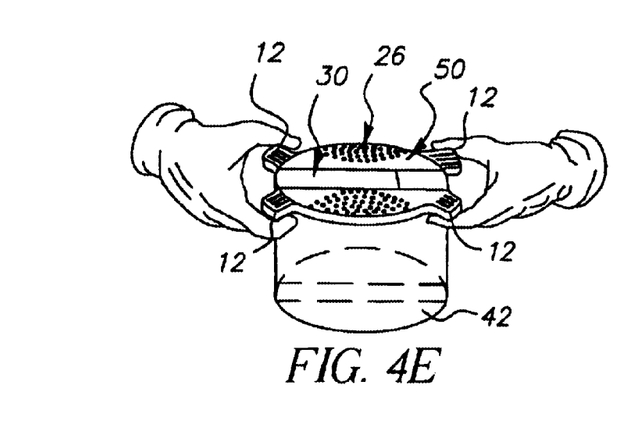
Figure 4F:
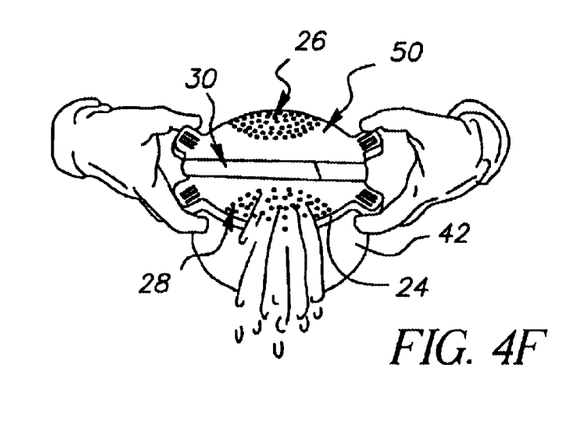

Step 4 (FIGS. 4D-1 through 4D-3), guide each end of the securing strap 30 over the respective securing strap notches 16 in the handles 10, slide a tapered end of the securing strap 30 through the D-ring 38 at its opposite end, pull each end of the securing strap 20 in opposite directions across the top surface 48 of the strainer body 50, and snug the strap 30 tight engaging approximately equal overlapping areas of the hook and loop fastener patches 34 and 36. At this point, the securing strap should be checked for looseness, both visually and by using a thumb and forefinger check for snugness just below the handles 10. If the strap 30 is loose, step 4 should be repeated.

Step 5 (FIG. 4E) pinch the handle 10 between the index finger and thumb at the grip notches 12.

Step 6 (FIG. 4F), lift the strainer body 50, together with the pot 42, rotating wrists/forearms while directing strained water into desired receptacle. A small amount of water may drip from a bottom edge 24 between the camp cook kit strainer body 50 and its outer side rim 18. Gently shake the camp cook kit strainer 50 and pot 42 allowing the last drops of water to drain. When done, remove the camp cook kit strainer 50 by reversing steps one through four.

Figure 4G:
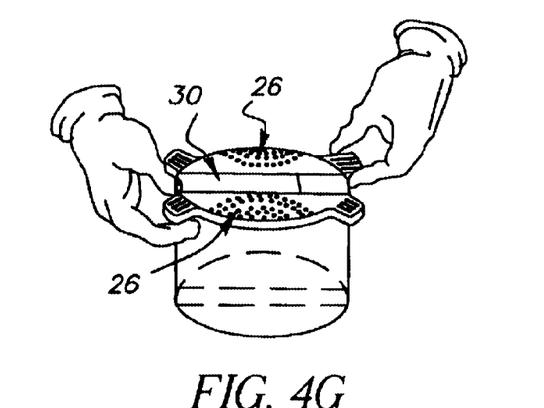
Figure 4H:
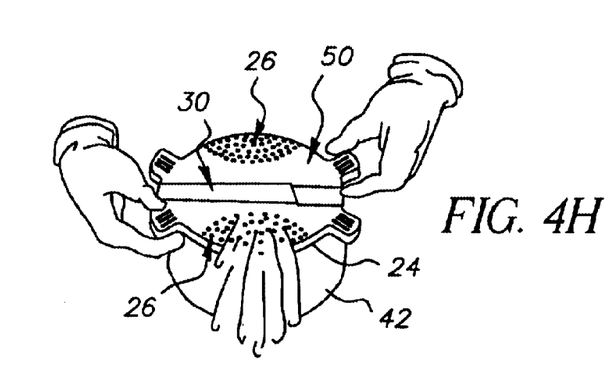

An alternative pouring method is shown in FIGS. 4G and 4H and described in alternative steps 5.1 and 6.1 below.

Step 5.1 (FIG. 5G) as an alternative to Step 5, grip the diagonally aligned handles 10 with the thumb and index fingers of the left and right hands, respectfully.

Step 6.1 (FIG. 4H) lift the strainer body 50, together with the pot 42, rotating wrists/forearms similar to step 6 while directing strained water into a desired receptacle. Like in step 6, a small amount of water may drip from the bottom edge 24.

Figure 5:
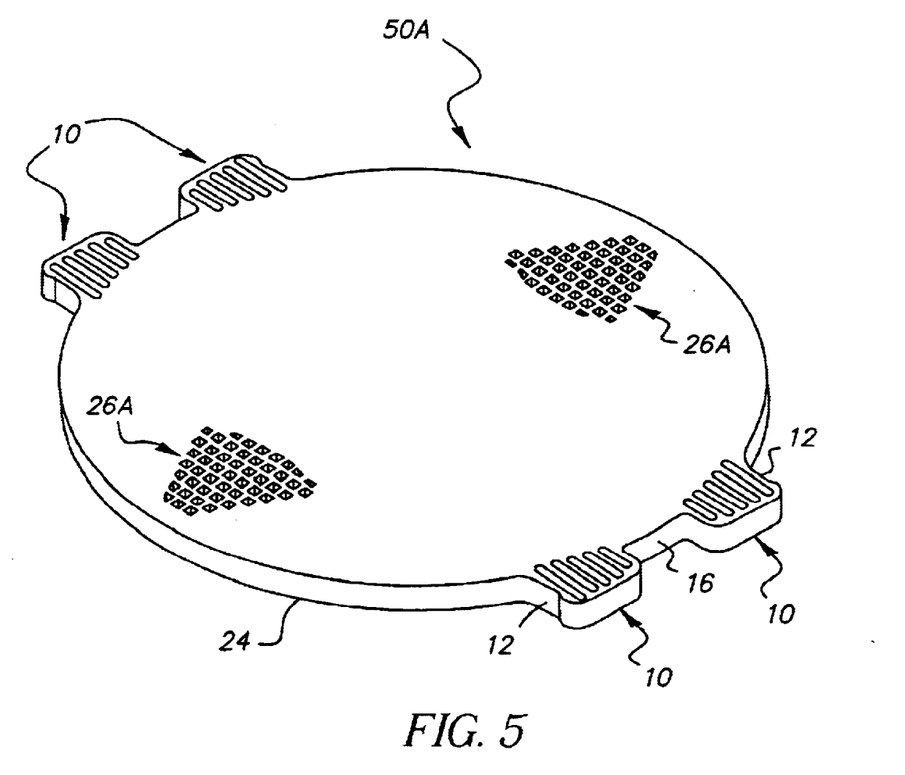
FIG. 5 shows an alternative camp cook kit strainer body modified to include two triangle-shaped strainer ports.

Alternative embodiments of the strainer body are illustrated in FIGS. 5–8. Of these, FIGS. 5 and 6 feature different porting arrangements. A strainer body 50A depicted in FIG. 5 is substantially the same as the strainer body 50 of FIG. 1. However, instead of arranging the strainer openings 28 in semicircular patterns, the strainer openings 28 of the strainer 50A are arranged to form triangle-shaped ports 26A for more directed pouring control.

Figure 6:
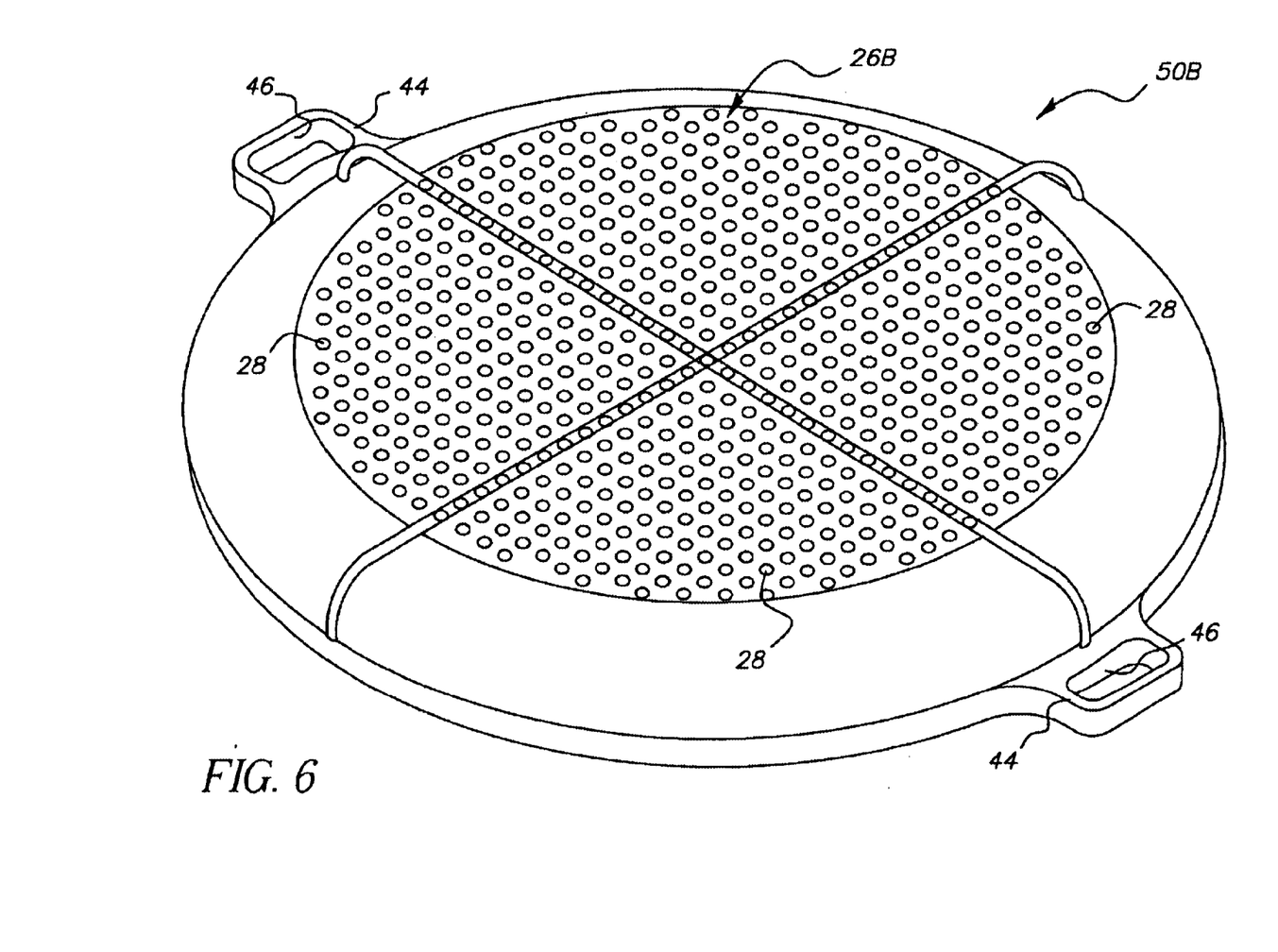
FIG. 6 shows an alternative cook kit strainer body with most of its surface area utilized as a common strainer port and having guide slots formed in a pair of handles for guiding a securing strap.

A strainer body 50B depicted in FIG. 6 includes a full complement at of strainer openings 28 dispersed substantially throughout the top surface 48 of the strainer body 50B forming a common strainer port 26B. In addition, alternative handles 44 are formed with strap-guiding slots 44 for threadably engaging the securing strap 30 with the strainer body 50B.

Figure 7:
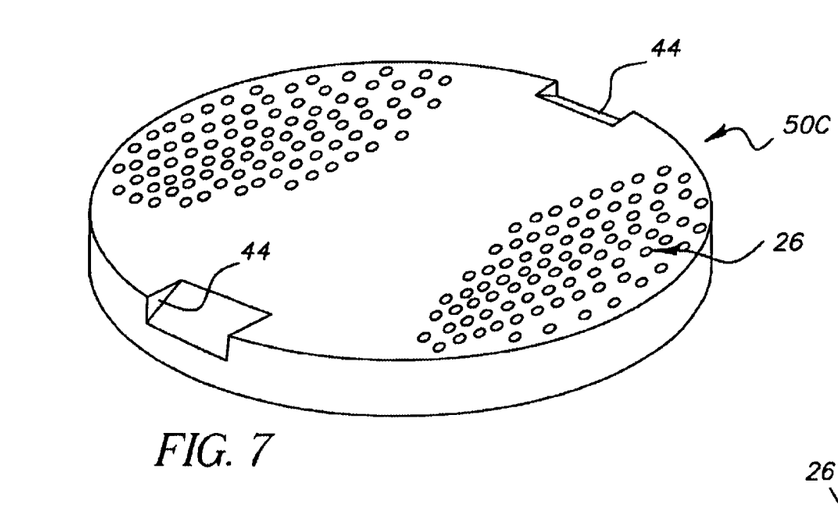
FIG. 7 shows an alternative cook kit strainer body without handles but retaining notches for guiding a securing strap.
Figure 8:
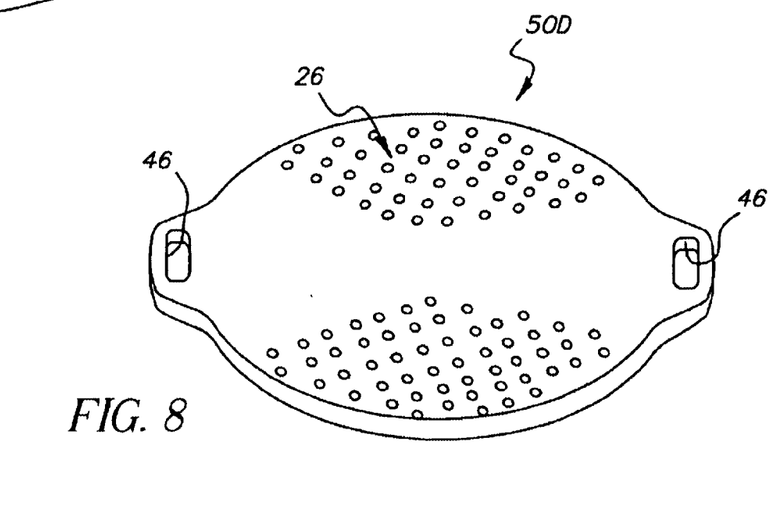
FIG. 8 shows an alternative cook kit strainer body with slots for guiding a securing strap.

FIGS. 7 and 8 feature alternative strap guiding features. A strainer body 50C depicted in FIG. 7 includes strap-guiding notches 44 but no handles. A strainer body 50D depicted in FIG. 8 includes slots 46 in place of notches 16 or 44. The function of the slots 46 remains the same—to guide the strap 30 in position around both a camp kit cook pot and the strainer body 50D.

Figures 9A, 9B:
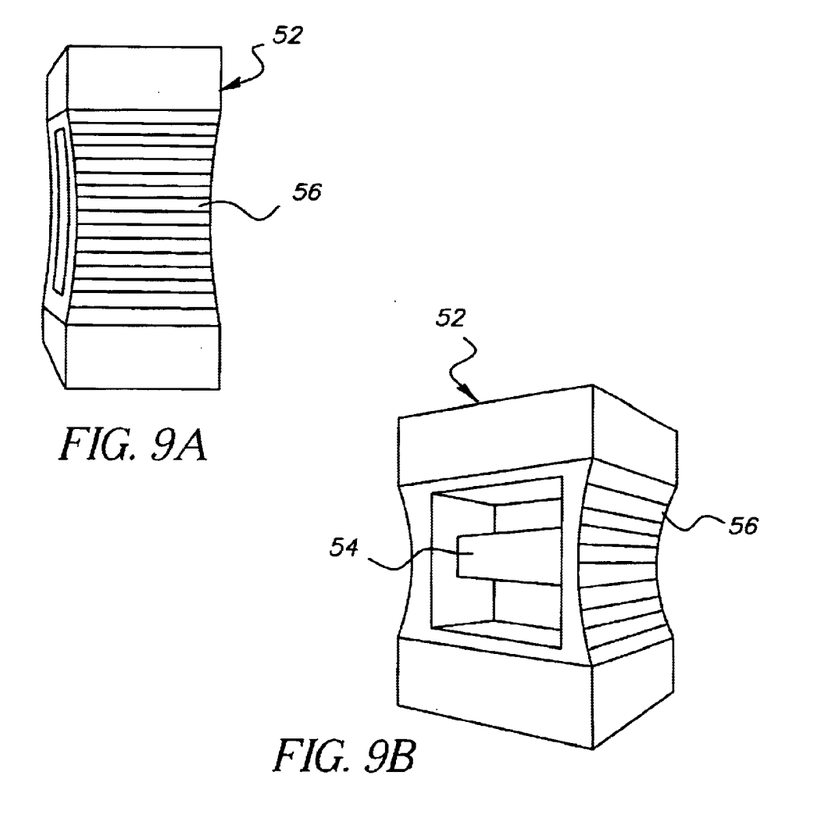
FIGS. 9A through 9C show details of a strap handle.
Figure 9C:
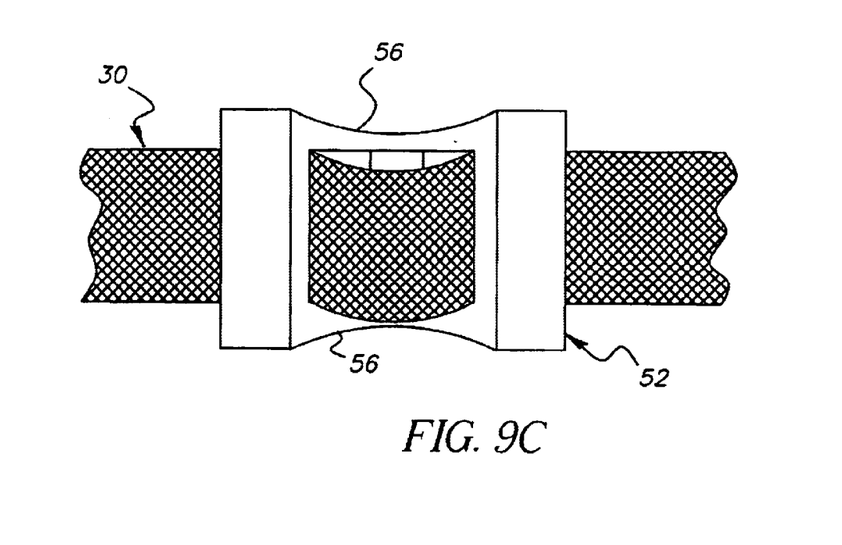
Figures 10, 11:
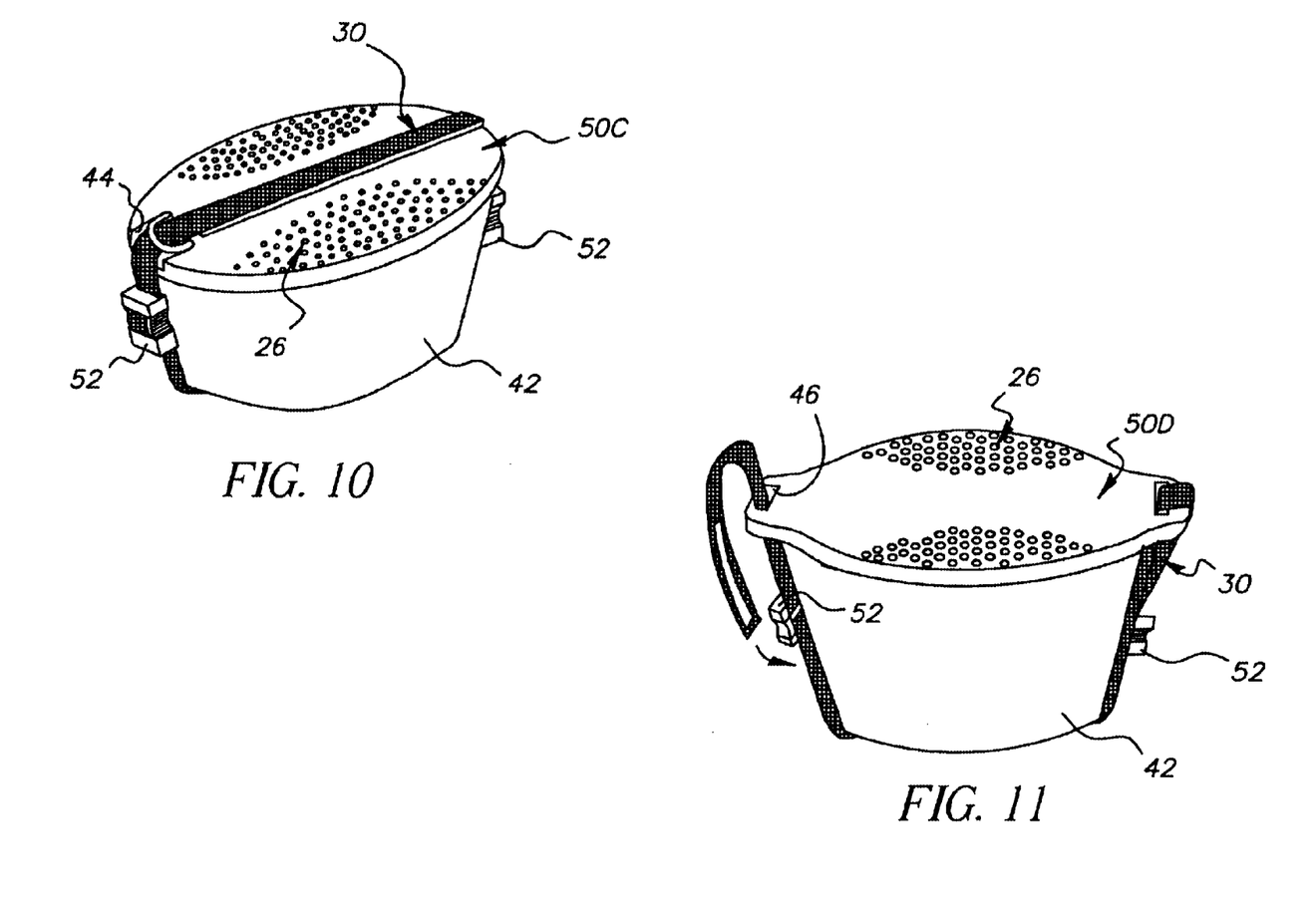
FIG. 10 shows an assembly of the strap handle of FIGS. 9A through 9C together with the strainer body of FIG. 7 on a conventional cooking kit pot.
FIG. 11 shows another assembly of the strap handle of FIGS. 9A through 9C together with the strainer body of FIG. 8 on a conventional cooking kit pot.

A strap handle 52 depicted in FIGS. 9A–9C is one of a pair of strap handles 52 that can be attached to the securing strap 30 as shown in FIGS. 10 and 11 to function as alternatives to the handles 10 of the prior embodiments. The strap handles 52 have equally spaced slanted bars 54 that allow the strap 30 to be threaded through the handles 52 for securing the handles 52 to the strap 30 as particularly shown in FIG. 9C. Indentations 56 in the sides of the strap handles 52 allow for more easily gripping the strap handles 52, particularly by using a thumb and second knuckle of a forefinger.

In FIG. 10, the strap handles 52 are shown in lifting positions along the strap 30 securing the strainer body 50C to the pot 42. In FIG. 11, the strap handles 52 are shown in lifting positions along the strap 30 securing the strainer body 50D to the pot 42.

Advantages

From the description above a number of advantages of my camp cook kit strainer, become evident:

(a) The camp cook kit strainer is secured to the top of a cook pot by a securing strap. Using the gripping features, the pot can be lifted and poured. The securing strap keeps the strainer fastened to the cook pot containing the prepared items, thus protecting the contents from the accidental dropping, bumping, kicking, and invasion by chipmunks.

(b) The strainer ports allow the flow of water to be directed into another cook pot for reuse or disposal.

(c) The straining ports allow the flow of water to be controlled to minimize splattering water.

(d) The specifically spaced concentric pot rims expand the versatility of one camp cook kit strainer to fit a variety of cooking pots.

(e) The strainer's flat design makes it a convenient accessory to any stock camp cook kit. The strainer is stored above or below the nested pots of the stock camp cook kit. The entire stack can be held together with the securing strap.

(f) The strainer can be made to accommodate pots of varying diameter, as well as pots of specific diameter.

(g) A secondary use due to its shape and composition is that of a cutting board.

Accordingly, it is apparent that the camp cook kit strainer of this invention can be used in wilderness camping situations to strain hot or cold water from a camp cook kit when boiling or re-hydrating is the means of preparing a selected food item. In addition, when the strainer and the securing strap are used, the contents are protected from potential dropping, accidental bumping or kicking, and invasion by chipmunks. Furthermore, the camp cook kit strainer has the additional advantages in that:

(a) It expands a limited camp menu by adding those selected food items currently omitted by eliminating straining hazards.

(b) It complements stock cook kits and camp cooking techniques, and is easily packed for transport in a backpack.

(c) It can be produced so that one strainer will fit a variety of pot sizes.

(d) It can be produced so that one strainer will fit a pot of specific diameter.

(e) It can be produced in plastic, stainless steel, aluminum, non-stick coated stainless steel or aluminum, and titanium.

Although the above description contains particular specifications, these should not be construed as limiting the scope of the invention but merely as providing illustrations of some of the preferred embodiments of this invention. For example the strainer ports could be different shapes; such as circular, oval, etc.; the grip handles could have other shapes; the hook and loop fasteners on the securing strap could be replaced by a buckle or snap, clip, etc.

Thus the scope of this invention should be determined by the appended claims and their legal equivalents, rather than by the examples given.

What is claimed is:

1. A strainer assembly for a camp cooking kit comprising:
a strainer body having a rigid form for overlying an open end of a camp cooking pot and a plurality of openings for pouring liquid from the camp cooking pot while preventing egress of other contents from the pot;
strap guiding features formed in the strainer for body for guiding a securing strap around both the strainer body and the camp cooking pot;
the securing strap including a fastening arrangement for securing the strainer body to the camp cooking pot; and
handles for gripping other portions of the strainer assembly and for tipping the strainer body together with the camp cooking pot to strain the contents of the cooking pot,
the securing strap including a fastening arrangement for securing the strainer body to the camp cooking pot; and
handles for gripping other portions of the strainer assembly for tipping the strainer body together with the camp cooking pot to strain the contents of the cooking pot,
wherein the handles are formed in the strainer body.

2. The strainer assembly of claim 1 in which the handles include two pair of handles formed in the strainer body and the handles of each of the pairs of handles being separated by one of the strap guiding features.

3. The strainer assembly of claim 1 in which the securing strap includes a hook and loop fastening system for securing the strap together.

4. A strainer assembly for a camp cooking kit comprising:
a strainer body having a rigid form for overlying an open end of a camp cooking pot and a plurality of openings for pouring liquid from the camp cooking pot while preventing egress of other contents from the pot;

strap guiding features formed in the strainer body for guiding a securing strap around both the strainer body and the camp cooking pot;

the securing strap including a fastening arrangement for securing the strainer body to the camp cooking pot; and handles for gripping other portions of the strainer assembly and for tipping the strainer body together with the camp cooking pot to strain the contents of the cooking pot, wherein the strap guiding features are notches formed in the strainer body.

5. The strainer assembly of claim 4 in which the handles are strap handles that attach to the securing strap.

6. A strainer assembly for a camp cooking kit comprising:

a strainer body having at least one rim for engaging a rim of a camp cooking pot and a plurality of openings for pouring liquid from the camp cooking pot while preventing egress of other contents from the pot;

strap guiding features formed in the strainer body for guiding a securing strap around both the strainer body and the camp cooking pot; and the securing strap including a fastening arrangement for securing the securing strap together for attaching the strainer body to the camp cooking pot and further comprising handles for gripping the strainer assembly and tipping the strainer body together with the camp cooking pot for straining contents of the cooking pot, wherein the handles include two pairs of handles formed in the strainer body and the handles of each of the pairs of handles are separated by one of the strap guiding features.

7. A strainer assembly for a camp cooking kit comprising:

a strainer body having at least one rim for engaging a rim of a camp cooking pot and a plurality of openings for pouring liquid from the camp cooking pot while preventing egress of other contents from the pot;

strap guiding features formed in strainer body for guiding a securing strap around both the strainer body and the camp cooking pot;

the securing strap including a fastening arrangement for securing the securing strap together for attaching the strainer body to the camp cooking pot, wherein the strap guiding features are notches formed in the strainer body; and handles for gripping other portions of the strainer assembly and tipping the strainer body together with the camp cooking pot for straining the contents of the cooking pot, the handles being strap handles that attach to the securing strap.

8. A strainer assembly for a camp cooking kit comprising:

a strainer body having at least one rim for engaging a rim of a camp cooking pot and a plurality of openings for pouring liquid from the camp cooking pot while preventing egress of other contents from the pot;

strap guiding features formed in the strainer body for guiding a securing strap around both the strainer body and the camp cooking pot;

the securing strap including a fastening arrangement for securing the securing strap together for attaching the strainer body to the camp cooking pot, wherein the strap guiding features are notches formed in the strainer body; and the securing strap includes a hook and loop fastening system for securing the strap together.

9. A strainer assembly for a camp cooking kit comprising:

a strainer body having at least one for engaging a rim of a camp cooking pot and a plurality of openings for pouring liquid from the camp cooking pot while preventing egress of other contents from the pot;

strap guiding features formed in the strainer body for guiding a securing strap around both the strainer body and the camp cooking pot; and the securing strap including a fastening arrangement for securing the securing strap together for attaching the strainer body to the camp cooking pot, wherein the securing strap includes a D-ring for threadably engaging another portion of the securing strap.

10. A strainer assembly for a camp cooking kit comprising:

a strainer body having at least one rim for engaging a rim of a camp cooking pot and a plurality of openings for pouring liquid from the camp cooking pot while preventing egress of other contents from the pot;

strap guiding features formed in the strainer body for guiding a securing strap around both the strainer body and the camp cooking pot;

the securing strap including a fastening arrangement for securing the securing strap together for attaching the strainer body to the camp cooking pot, wherein the strainer body includes top and bottom surfaces and the at least one rim is one of a plurality of concentric rims that project from the bottom surface to accommodate different size cooking pot; and the top surface of the strainer body is flat and the concentric rims have equal thickness to facilitate use of the strainer body as a cutting board.

11. A method of assembling a strainer together with a camp cooking pot for straining contents of the pot comprising the steps of:

laying out a securing strap;

placing the cooking pot on the securing strap;

placing a rigid strainer body over an open end of the cooking pot;

aligning strap guiding features of the strainer body with the securing strap; and wrapping the securing strap around both the cooking pot and the strainer body in engagement with the strap guiding features of the strainer body for securing the strainer body to the cooking pot.

* * * * *